Nov. 12, 1957 C. B. COLEMAN 2,812,873
LOAD HANDLING AND TRANSPORTING VEHICLE
Filed Jan. 27, 1955 2 Sheets-Sheet 1
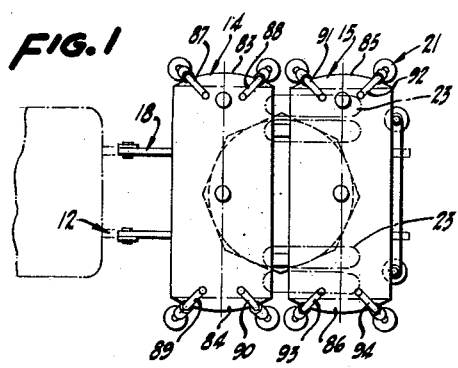
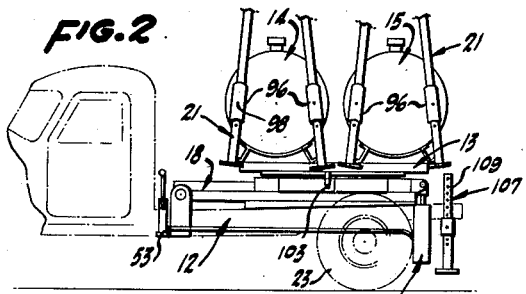
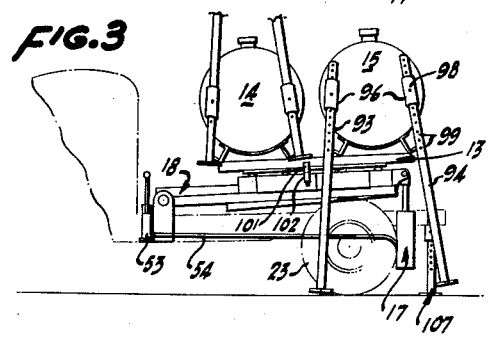
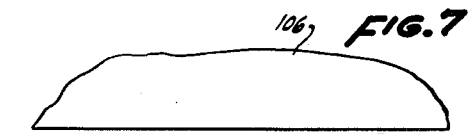
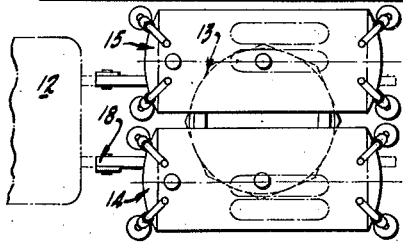
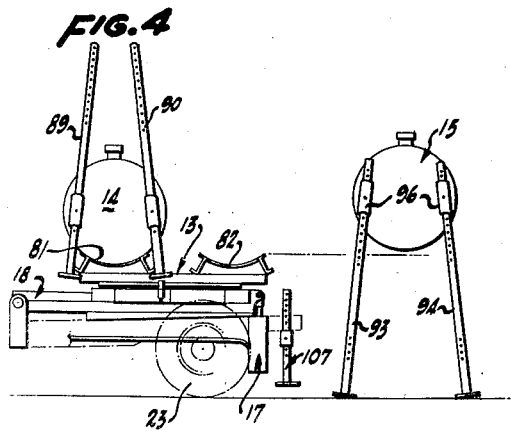
INVENTOR.
CLARENCE B. COLEMAN
BY
His attorney

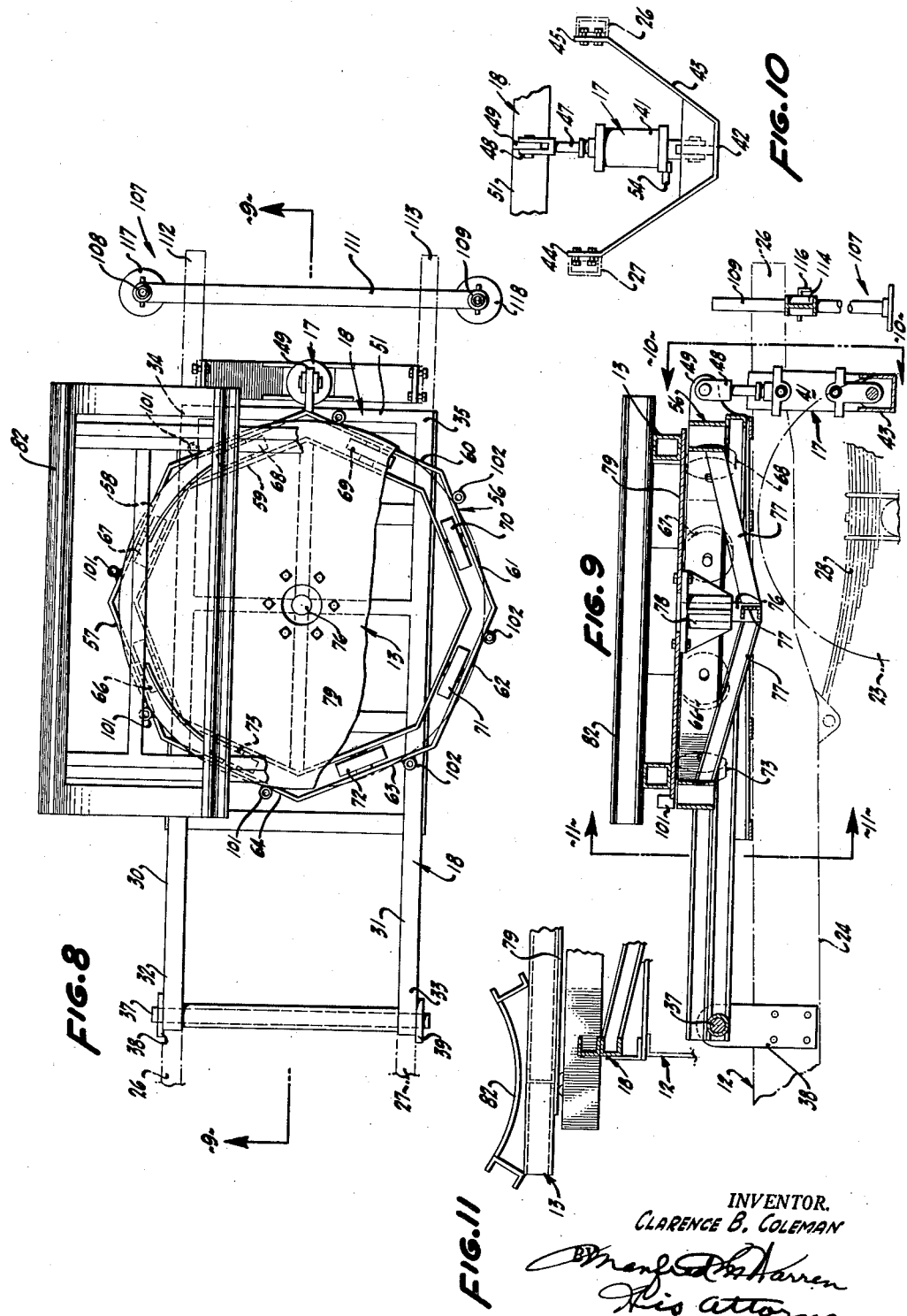

United States Patent Office 2,812,873
Patented Nov. 12, 1957

2,812,873
LOAD HANDLING AND TRANSPORTING VEHICLE

Clarence B. Coleman, Oakland, Calif.

Application January 27, 1955, Serial No. 484,448

7 Claims. (Cl. 214—515)

The invention relates to load bearing vehicles such as trucks, trailers and the like, and more particularly to such vehicles as are especially equipped with auxiliary mechanisms for lifting, orienting or otherwise handling the loads carried thereby.

An object of the present invention is to provide a load bearing vehicle of the character described in which the loading and unloading operations may be accomplished with greater efficiency, ease and flexibility.

Another object of the present invention is to provide a machine of the character described in which the entire load carrying bed may be rotated in a horizontal plane and elevated and lowered so as to most conveniently and also selectively position articles on the bed for delivery therefrom or to position open parts of the bed for receipt of articles to be loaded thereon.

A further object of the present invention is to provide in a machine of the character described load bearing containers of the re-usable or refillable type which are equipped with depending ground engaging supports and are otherwise arranged to specially cooperate with the vehicle and movable bed, as above described, to provide a more economical transporting and handling of materials, liquid or dry, wherever the use of containers on an exchange basis is feasible.

The invention possesses other objects and features of advantage, some of which, with the foregoing, will be set forth in the following description of the preferred form of the invention. It is to be understood, however, that variations in such description may be adopted within the scope of the invention as set forth in the claims.

Referring to said drawings:

Figure 1 is a plan view of a load transporting and handling machine constructed in accordance with the present invention.

Figure 2 is a side elevation of the machine.

Figure 3 is a side elevation similar to Figure 2 but showing the load carrying bed of the machine in elevated position and one of the containers in delivery position.

Figure 4 is a side elevation similar to Figure 3 but showing the parts in a delivered position of a container.

Figure 5 is a plan view of the machine similar to Figure 1, showing one of the containers removed.

Figure 6 is a plan view of the machine similar to Figure 1 but showing the load supporting bed of the machine in a rotated position.

Figure 7 is a plan view of the machine similar to Figure 1 but showing the load supporting bed of the machine in a further rotated position.

Figure 8 is a plan view of the machine taken on an enlarged scale with portions of the structure broken away for clarity of illustration.

Figure 9 is a vertical cross-sectional view of the portion of the machine illustrated in Figure 8 taken substantially on the plane of line 9—9 of Figure 8.

Figure 10 is a fragmentary cross-sectional view taken substantially on the plane of line 10—10 of Figure 9.

Figure 11 is a fragmentary cross-sectional view taken substantially on the plane of line 11—11 of Figure 9.

The load transporting and handling machine of the present invention consists briefly of a vehicle chassis 12, a load supporting bed 13 mounted on the chassis for rotation in a substantially horizontal plane and about a vertical axis for positioning articles such as containers 14 and 15 on the bed at selectable locations widthwise and longitudinal of the chassis, and means 17 for raising and lowering the bed on the chassis. Preferably the bed 13 is carried by a subframe 18 which is mounted on the chassis for raising and lowering relative thereto and which, in turn, supports the bed 13 for rotation about a vertical axis substantially centrally of the widthwise dimension of the chassis. Also cooperating in the combination, the containers 14 and 15 are carried on the bed and may be reversibly positioned upon appropriate rotation of the bed to relatively fore and aft positions with respect to the chassis, and are provided with ground engaging means 21 positioned for spanning of the widthwise dimension of the chassis and subframe and bed, and extendable to ground engaging position in the raised position of the bed, as depicted in Figure 3, for delivery of the rearmost container 15.

The machine of the present invention may be incorporated in various types of vehicles, such as automotive trucks and trailers. An automotive truck is here shown, having a chassis including ground engaging wheels 23 and a chassis frame 24, including spaced longitudinal frame rails 26 and 27, and carried by the wheels by means of a conventional spring structure 28.

The subframe 18 here includes a pair of longitudinal frame members 30 and 31 which, for convenience in raising and lowering of the subframe and superimposed bed 13, are here pivotally mounted on the chassis at the relatively forwardly disposed ends 32 and 33 of the subframe for raising and lowering of the rearwardly disposed ends 34 and 35 of the subframe. Of course, as will be understood, other supported structures may be employed for the subframe to effect its relative raising and lowering with respect to the chassis. However, in the operations of the present machine it is most essential that the rearwardly disposed end of the bed 13 be raised and lowered and accordingly it is convenient to pivot the forwardly disposed ends 32 and 33 of the subframe as suggested. As here shown, such ends are secured by a transverse pivot pin 37 to brackets 38 and 39 secured to the rails 26 and 27 of the chassis frame.

The means 17 for raising and lowering of the subframe 18 is preferably manually controlled and here consists of a hydraulic jack mounted between the chassis and subframe. With reference to Figures 8, 9 and 10, it will be seen that the housing or cylinder 41 of the actuator 17 is pivotally secured to the central portion 42 of a U-shaped bracket 43 having its upper ends 44 and 45 fastened to the frame rails 26 and 27. The piston or ram part 47 of the actuator is provided with a clevis bracket 48 pivotally secured to a strap 49 fixed to a rear cross-member 51 of the subframe 18. Energizing of the actuator 17 for raising and lowering of the subframe may be effected by manually operated or manually controlled power-operated pump means. The former is quite satisfactory for most applications and, as here shown, a hand-operated pump 53 is mounted on the side of the vehicle as seen in Figures 2 and 3, and is operatively connected by conduit 54 to the hydraulic cylinder 17.

Forming part of the subframe, directly below and supporting the bed 13 is a polygonal frame structure 56, here of octagonal form, including spaced parallel polygonal sides 57, 58, 59, 60, 61, 62, 63 and 64. Wheels 66, 67, 68, 69, 70, 71, 72 and 73 are mounted between each pair of polygonal sides on horizontal radially disposed axles carried by such sides for rotation of the wheels in vertical planes parallel to the sides. The subframe is also provided with a centrally disposed vertical spindle 76 carried by radial supporting members 77 to provide a central bearing means for a depending tubular bearing 78 carried by and depending from a flat bottom plate 79 of the bed 13, the bottom 79 thus being supported on the wheels 66—73 for rotation in a horizontal plane.

In the present showing and as an important feature of the present construction, the containers 14 and 15 are demountably carried by the rotating bed 13 for picking up and delivering by the machine, and are accordingly preferably of the re-usable or refillable type for handling of various materials, liquid or dry, wherever the use of this type of container is feasible on an exchange basis. As here shown, the containers 14 and 15 are in the form of elongated cylindrical tanks as customarily used for storage and dispensing of gases or liquids such as fuel, fertilizers and the like. For example, the machine of the present invention is well adapted for handling the delivery of tanks containing aqua ammonia where full tanks may be transported to a desired point of use, as alongside a ditch or the like, into which the fertilizer may be dispensed, and the machine is likewise adapted for picking up the containers when emptied of their contents and returning them for refilling and re-use. To accommodate the demountable support for such tanks, the bed 13 is here provided with elongated saddle means 81 and 82 which provide spaced elongated upper concave surfaces for receiving and nesting the bottom of the tanks 14 and 15, thereby locating the latter in side by side position as illustrated. As will be observed from Figure 1, the tanks 14 and 15 are preferably formed with a lengthwise dimension greater than the widthwise dimensions of the chassis, subframe and bed, so that the opposite ends 83 and 84 of tank 14, and similarly the opposite ends 85 and 86 of tank 15, will overhang the full transverse dimensions of the vehicle, including the wheels 23, when the tanks are arranged in transversely extending position, as seen in Figure 1. Accordingly the depending ground engaging means 21 carried by the containers 14 and 15 may be let down vertically and into engagement with the ground while completely spanning the widthwise dimension of the vehicle. As here shown, such means consists of a pair of vertically movable legs 87 and 88 mounted on the container end wall 83, and similar legs 89 and 90 on end wall 84, and legs 91 and 92 on end wall 85, and legs 93 and 94 on end wall 86. As will be observed from the drawings, each of the end walls 83—86 are provided with horizontally spaced generally vertically extending sleeves 96 which slidably carry for vertical reciprocation the legs 87—94. The sleeves 96 may be angularly positioned on the end walls of the containers so as to cause the legs 87—94 to diverge downwardly to increase the lateral extent of the underlying support provided by the base ends of the legs. The latter are preferably provided with widened feet 97 for improving their ground support. Securing of the sleeves and legs in selected vertical positions of the legs may be effected by pins 98 carried by the sleeves and engageable through longitudinally spaced openings 99 in the legs.

The combination of members and parts as above described provides a variety of highly effective material handling operations, some of which are indicated in Figures 1 to 7 of the drawing. In normal operation, full tanks 14 and 15 to be delivered may be mounted on the truck, as illustrated in Figure 1—that is, with the bed 13 rotated to a transverse position of the tanks. Latch means is preferably provided for holding the bed in this as well as other of its rotated positions. As here shown, the bed and subframe are provided with a plurality of sleeve members 101 and 102 mounted for registration in different and selected rotated positions of the bed for receipt of a locking pin. The truck is driven to the point of delivery of the first container. At such position the subframe 18 and superimposed bed 13 and loaded tanks are elevated, as illustrated in Figure 3, thus raising particularly the rearwardly disposed tank 15. The legs 91—94 of this tank are then lowered to the ground and fixed in their sleeves, as shown in Figure 3. Since the legs are individually adjustable in their sleeves, the tank may be set down on uneven terrain. After lowering and setting of the legs, the bed is lowered, thus effecting a relative elevation of tank 15 out of its saddle 82 and lowering the latter to a point where the truck may be driven forwardly out from under container 15 now supported on the ground by its legs 91—94. The truck may then be driven to the point of delivery of the second tank 14. At such location, the turntable may be rotated as indicated in Figure 5, so as to position tank 14 rearmost. The bed may then be raised, legs on tank 14 dropped, the bed again lowered, and the truck driven out from under the tank in the manner described above in connection with the delivery of tank 15. At either of the delivery locations or elsewhere, the truck may be backed under an empty tank supported on its legs as illustrated in Figure 4, the bed elevated so as to engage the tank in the rearwardly disposed saddle 82, and the legs of the tank raised so as to support the tank on the bed.

Usually the tank to be delivered will be oriented at the rear of the truck by appropriate rotation of the bed, as above described, and in picking up a tank, the empty saddle 81—82 is similarly positioned to the rear of the truck. Of course since the tanks and their ground engaging means are both sufficiently wide to completely straddle the truck, it is possible to deliver both tanks at the same time or to pick up two side by side tanks at the same time. It is also possible and desirable in many instances to either deliver or pick up tanks when oriented with their length other than perpendicular to the length of the vehicle. Such an arrangement is illustrated in Figure 6, in which it will be noted that the rearwardly disposed tank 15 and its ground engaging legs may be delivered from the truck with the tank turned to an oblique angle. In a similar but reverse operation, it will be understood that the truck may be run under a tank positioned at an oblique angle. It is also desirable in many instances to turn the tanks 14 and 15 with their axis parallel to the longitudinal axis of the truck. This is particularly so in cases where the truck may be run alongside of a loading dock 106, as illustrated in Figure 7, so as to arrange the tanks 14 and 15 parallel to the loading dock for removal of the tanks by means of a fork truck or other tank handling equipment. The truck turntable may be similarly positioned to receive tanks from a loading dock.

Preferably the chassis frame of the vehicle is provided with depending ground engaging means 107 which may be let down into engagement with the ground for stabilizing the support of the frame during loading and unloading of the containers, particularly in those instances where such loading or unloading operations are carried on with the containers at an oblique or off-center position, and to be elevated after such loading or unloading operations during the transportation of the load. As here shown, a pair of vertically adjustable leg members 108 and 109 are mounted at the opposite ends of a frame cross-member 111 secured to the rear ends 112 and 113 of the chassis rails 26 and 27. The legs are here mounted through sleeves 114 and secured in vertically adjusted position by pins 116 inserted through registerable openings in the sleeves and legs. Enlarged feet 117 and 118 are provided at the lower ends of the legs 108—109 for improved ground engagement and support.

I claim:

1. A load transporting and handling machine comprising, a vehicle chassis, a single load supporting bed mounted on said chassis for rotation in a substantially horizontal plane and about a vertical axis, means for raising and lowering said bed on said chassis, a plurality of elongated containers, saddle means provided on said bed for receiving and supporting said containers and making said containers accessible upon appropriate rotation of said bed in relatively fore and aft positions with respect to said chassis, said containers having a lengthwise dimension greater than the widthwise dimensions of said bed and said chassis, and depending ground engaging means carried by said containers and spanning the widthwise dimensions of said bed and chassis and extendable to ground engaging position in the raised position of said bed, said saddle means being formed for lifting of said containers therefrom and for lowering of said containers to supported position thereon thereby cooperating with the raising and lowering of said bed and rotary displacement thereof and said ground engaging means to load and unload said containers into and from said saddle means.

2. A load transporting and handling machine comprising, a vehicle chassis, a subframe mounted on said chassis, a flat load supporting bed mounted on said subframe for rotation in a substantially horizontal plane and about a vertical axis substantially centrally of the widthwise dimension of said chassis, a plurality of containers demountably carried on said bed and reversibly positionable upon appropriate rotation of said bed in relatively fore and aft positions with respect to said bed and subframe and chassis, said subframe being pivotally mounted on said chassis at the relatively forwardly disposed end of said subframe for raising and lowering of the relatively rearwardly disposed end of said subframe and said bed, manually controlled means mounted between said subframe and said chassis for raising and lowering said rear end of said subframe and bed and rearwardly positioned thereon, and depending ground engaging means carried by said containers and spanning the widthwise dimensions of said chassis and subframe and bed and extendable to ground engaging position when in said aft position and in the raised position of the rear end of said subframe and bed.

3. A load transporting and handling machine as characterized in claim 2 and including latch means for holding said bed against rotation in the aft position of one of said containers.

4. A load transporting and handling machine comprising, a vehicle chassis, a polygonal subframe mounted on said chassis for raising and lowering relative to said chassis and having a plurality of substantially vertically set polygonal sides, wheels carried by said sides for rotation in vertical planes, a load supporting bed, bearing means carried by said subframe centrally thereof and journaling said bed for rotation about a vertical axis with said bed supported on said wheels for rotation in a horizontal plane, a plurality of elongated containers demountably carried by said bed and selectably positionable upon appropriate rotation of said bed in various transversely related positions, manually controlled means for raising and lowering said subframe on said chassis to correspondingly raise and lower said bed and articles supported thereon, depending ground engaging means carried by said containers and capable of spanning the widthwise dimensions of said chassis and subframe and in said transversely related positions of said containers and extendable to ground engaging position in the raised position of said bed, and latch means provided on said polygonal sides and said bed for holding said bed in selected rotated positions.

5. A load transporting and handling machine comprising, a vehicle chassis including ground engaging wheels and a spring mounted chassis frame, a single load supporting bed mounted on said frame for rotation in a substantially horizontal plane and about a vertical axis, means for raising and lowering said bed on said frame, a plurality of elongated containers demountably carried by said bed and selectably positionable upon appropriate rotation of said bed in various transversely related positions, depending ground engaging means carried by said containers and spanning the widthwise dimensions of said frame and bed in said transversely related positions of said containers and extendable to ground engaging position in the raised position of said bed so as to cooperate with said raising and lowering of said bed to effect loading and unloading of said containers, and depending ground engaging means carried by said frame for stabilizing the support thereof during loading and unloading of said containers.

6. A load transporting and handling machine comprising, a vehicle chassis, a plurality of load bearing wheels carried thereby for rotation in vertical planes, a load bed, bearing means journaling said bed for rotation about a vertical axis with said bed supported on said wheels, a plurality of containers demountably carried by said bed and rotatable therewith to a pick-up and delivery position, manually controlled means for raising and lowering said bed and containers, depending ground engaging means carried by said containers and capable of spanning the widthwise dimensions of said chassis in said position and extendable to the ground in the raised position of said bed to thereby provide an optional pick-up and delivery of said containers, and latch means for holding said bed in selected rotated position.

7. A load transporting and handling machine comprising, a vehicle chassis, a subframe mounted on said chassis for raising and lowering relative thereto, a plurality of load bearing wheels carried by said subframe for rotation in vertical planes, a load bed, bearing means carried by said subframe and journaling said bed for rotation about a vertical axis with said bed supported on said wheels, a plurality of containers demountably carried by said bed and rotatable therewith to a pick-up and delivery position, manually controlled means for raising and lowering said subframe on said chassis to correspondingly raise and lower said bed and containers, depending ground engaging means carried by said containers and capable of spanning the widthwise dimensions of said chassis and subframe in said position and extendable to the ground in the raised position of said bed to thereby provide an optional pick-up and delivery of said containers, and latch means connecting said subframe and bed for holding said bed in selected rotated position.

References Cited in the file of this patent
UNITED STATES PATENTS

| | | |
|---|---|---|
| 1,541,457 | Winn | June 9, 1925 |
| 1,910,398 | Ludington | May 23, 1933 |
| 2,517,304 | Greening | Aug. 1, 1950 |
| 2,596,838 | Carver et al. | May 13, 1952 |
| 2,598,099 | Bates et al. | May 27, 1952 |